United States Patent [19]

Queen et al.

[11] Patent Number: 4,801,169

[45] Date of Patent: Jan. 31, 1989

[54] AUTOMOTIVE TRUNK LINER

[75] Inventors: Robert A. Queen, Marion, N.C.; Michael D. Faloon, Canton Township, Mich.

[73] Assignee: Collins & Aikman Corporation, New York, N.Y.

[21] Appl. No.: 172,319

[22] Filed: Mar. 23, 1988

[51] Int. Cl.$^4$ .............................................. B62D 25/00
[52] U.S. Cl. .................................. 296/39.1; 296/39.2; 296/97.23
[58] Field of Search ................. 296/39 R, 39 A, 37.2, 296/37.3, 37.14, 1 F; 224/42.42, 42.24, 42.12, 42.2, 311, 309

[56] References Cited

U.S. PATENT DOCUMENTS

| | | | |
|---|---|---|---|
| 2,911,253 | 11/1959 | Dewey | 296/39 R |
| 4,226,461 | 10/1980 | Ackel | 296/37.14 |
| 4,398,765 | 8/1983 | Ishikawa | 296/37.14 X |
| 4,423,900 | 1/1984 | Sugimoto et al. | 224/42.12 X |
| 4,673,207 | 6/1987 | Reynolds et al. | 296/39 R |

Primary Examiner—Johnny D. Cherry
Assistant Examiner—John Gruber
Attorney, Agent, or Firm—Bell, Seltzer, Park & Gibson

[57] ABSTRACT

A trunk liner is disclosed for an automobile trunk compartment of the type having a spare tire well recessed in a medial floor area of the comparmtent. The trunk liner is formed of fibrous material and molded to form a relatively stiff body having a center floor cover panel and a plurality of panels extending unwardly along the sides of the center floor cover panel and integrally connected thereto, and a recessed spare tire well liner integral with and extending downwardly from a medial portion of the center floor cover panel. The stiffness of the molded fibrous body and the outwardly diverging relationship of the plurality of panels permit the panels to resiliently engage inner wall surfaces of the trunk when the panels are biased inwardly toward an upright position when mounted in the trunk. A separately formed cover for the spare tire well liner is provided, with the trunk liner having a relatively narrow molded ledge extending around the spare tire well liner for receiving the cover in proper position.

23 Claims, 5 Drawing Sheets

AUTOMOTIVE TRUNK LINER

BACKGROUND OF THE INVENTION

This invention is an improvement over the automobile trunk liner as disclosed in recently granted U.S. Pat. No. 4,673,207, commonly owned by the assignee of this invention. While the one piece trunk liner of this patent is a vast improvement over the multi-piece trunk liners of the prior art, it has been learned that for certain styles of automobiles, it is desirable for the spare tire well to be lined with the same material as that forming the body of the trunk liner.

With the foregoing in mind, it is the primary purpose of this invention to form an automobile trunk liner of integral molded construction wherein there is a first drawn portion as represented by side walls extending upwardly from a center floor cover panel, and a second drawn portion as represented by a recessed spare tire well extending downwardly from a medial portion of a center floor cover panel.

It is a further object of this invention to provide a molded one-piece trunk liner with an integrally formed recessed spare tire well therein and wherein accommodation is made in the liner for reception of a separately formed cover and lid for the spare tire well.

SUMMARY OF THE INVENTION

These and other objects and advantages of the present invention are accomplished by a trunk liner for an automobile trunk compartment wherein the trunk liner comprises an integrally molded relatively stiff fibrous body having a center floor cover panel, and a plurality of panels integrally connected to the center floor cover panel and extending upwardly along the sides of the center panel. A recessed spare tire well liner is integral with and extends downwardly from a medial portion of the center panel.

In the preferred embodiment a thermoplastic coating on the backside of the fibrous body imparts hardness to the backside and an overall stiffness and shape retention to the fibrous body. A spare tire cover overlies the recessed spare tire well liner and has edge portions overlying an adjacent portion of the center floor cover panel. A rigid lid is carried by the spare tire cover on the backside thereof and is adapted to overlie and rest upon adjacent edge portions of the center floor cover panel and cover the spare tire well liner. To present an aesthetically pleasing appearance to the spare tire cover thereto, the spare tire cover has edge portions overlying and covering the periphery of the rigid lid.

BRIEF DESCRIPTION OF THE DRAWINGS

Some of the objects and advantages of the present invention having been stated, others will appear as the description proceeds, when considered in conjunction with the accompanying drawings in which—

DETAILED DESCRIPTION OF THE DRAWINGS

Figure 1:
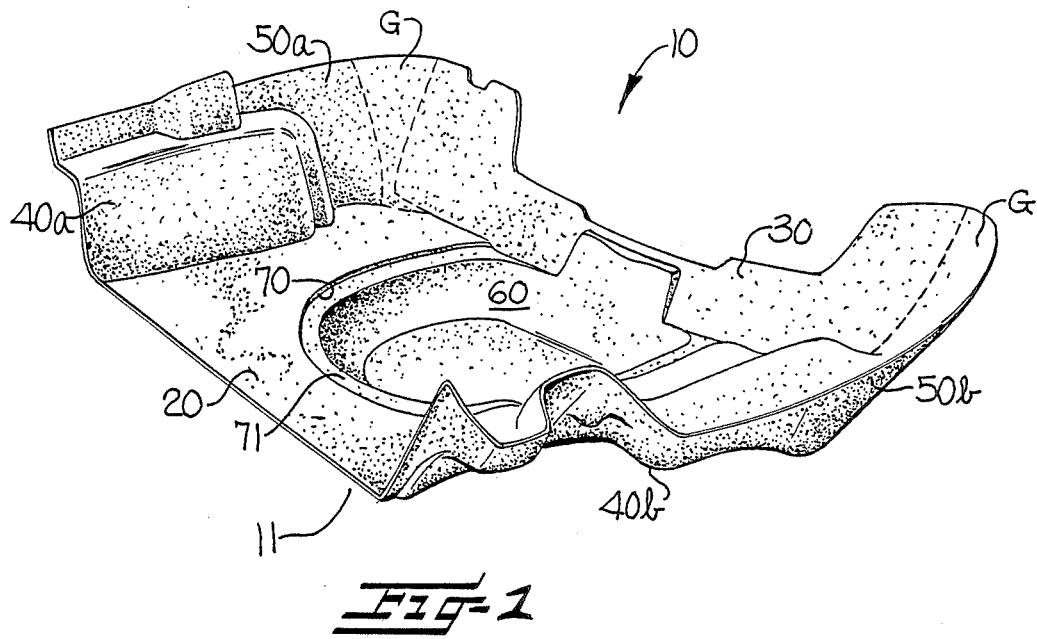
FIG. 1 is a top perspective view of the trunk liner substantially as the same appears when taken out of the mold.
Figure 2:
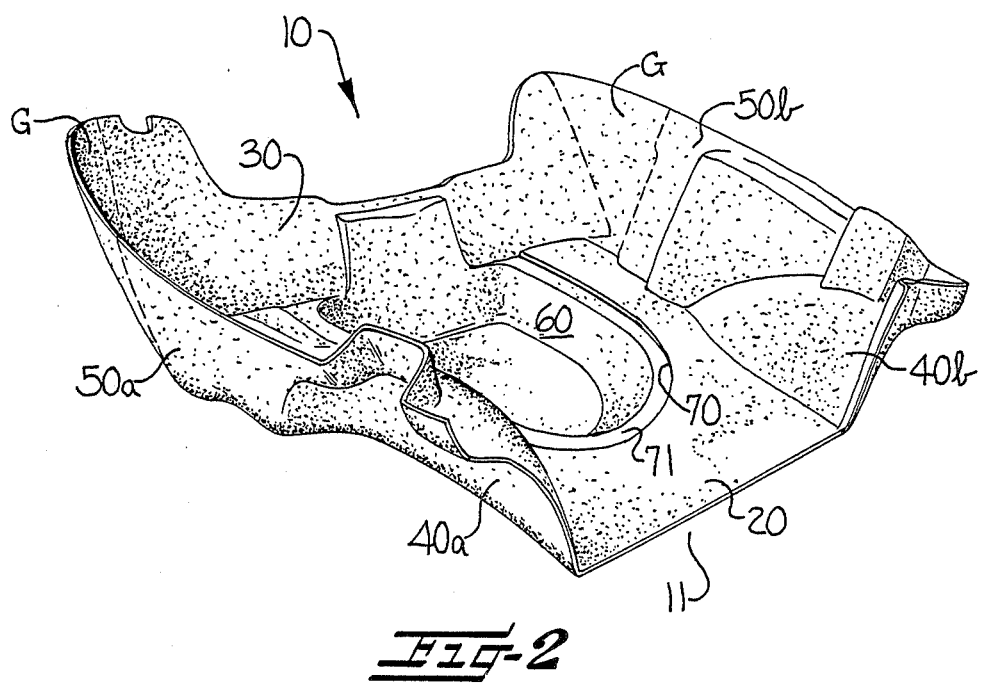
FIG. 2 is another top perspective view similar to FIG. 1 but looking from the opposite side of FIG. 1.

Referring now specifically to the drawings, there is illustrated a preferred embodiment of the invention wherein reference numeral 10 designates the trunk liner as the same substantially appears when removed from a mold. This form of the trunk liner is best illustrated in FIGS. 1 and 2 of the drawings. On the other hand, reference numeral 10' designates the completed trunk liner after the same has been suitably trimmed following the molding thereof and after the same has had other components added thereto on the backside, such as insulator pads and a rigid lid underlying a spare tire cover and acting as a cover for covering a spare tire well. This completed form of the trunk liner is best illustrated in FIGS. 3 to 5 and 7 to 11.

For purposes of simplicity, the various elements or features of the completed trunk liner will bear the same reference numerals as the molded but unfinished trunk liner, but with the prime notation added thereto.

As best shown in FIGS. 1 and 2, the trunk liner 10 shown as removed from a typical pressure molding operation utilizing mating male and female molding components, comprises a center floor cover panel 20 and a plurality of panels extending along the sides of said center floor panel and integrally connected thereto. These panels include a rear end panel 30 having lower end portions connecting rearmost portions of said center floor panel 20 and divergingly extending upwardly and outwardly therefrom. Right and left rear wheel housing cover panels 40a and 40b, respectively are connected to opposite sides of said center floor cover panel 20 and divergingly extend upwardly and outwardly therefrom. Right and left inner panels 50a and 50b respectively are also connected to opposite sides of said center floor cover panel 20 and are divergingly arranged to extend upwardly and outwardly therefrom. These right and left inner panels 50a and 50b are positioned rearwardly of the right and left rear wheel housing cover panels 40a, 40b and are respectively connected to rearmost portions of the right and left rear wheel housing cover panels 40a, 40b, respectively.

The molded trunk liner 10 is formed of any suitable fibrous material that may readily be subjected to molding. While many textile fibers may be used, polyester staple fibers that have been needle punched or preneedled to form a non-woven fabric have been found to be quite suitable as well as economical to use. In the preferred embodiment shown herein, a moldable coating 11 is applied to the backside of the non-woven fabric and dried prior to being molded. This coating serves to impart shape retention and stiffness to the overall molded body upon the molding operation being completed. A relatively lightweight coating of thermoplastic material of a wide variety may be used. However, coatings of polyethylene or moldable latex have each been proven to be suitable, with latex offering the better shape retention. Conventional coating equipment is readily used with either type of coating. The upper surface of the trunk liner is desirably formed of soft fibrous material, preferably in the form of pile fibers. The back of the body of the trunk liner is relatively hard and rigid to provide the molded memory and shape retention for the trunk liner. Alternatively, instead of a coating, the desired moldability, stiffness and shape retention properties can be imparted to the trunk liner by other means such as by the composition of the fibrous material itself, as an example, through the use of a web containing heat activatable potentially adhesive fibers. One such product is disclosed in commonly owned U.S. Pat. No. 4,568,581.

Integral with and extending downwardly from a medial portion of the center floor cover panel 20 is a recessed spare tire well liner indicated by reference numeral 60. The recessed spare tire well liner 60 is formed during the molding operation by clamping the trunk liner with a varying pressure ring clamp and deep drawing the tire well using male and female mating mold images. The pressure of the ring clamp is varied to allow controlled sliding of the trunk liner fabric into the cavity during drawing so as to prevent tearing or wrinkling of the fabric.

Molded integral into the center floor cover panel 20 is an upstanding shoulder 70 which extends around a substantial portion of the spare tire well liner 60 and in spaced relation thereto. Extending between the upstanding shoulder 70 and the spare tire well liner 60 is a relatively narrow ledge portion 71. As will be seen later, as the description proceeds, the upstanding shoulder 70 and the relatively narrow ledge portion 71 retain a spare tire cover to provide a lid for the spare tire well liner 60.

Figure 3:
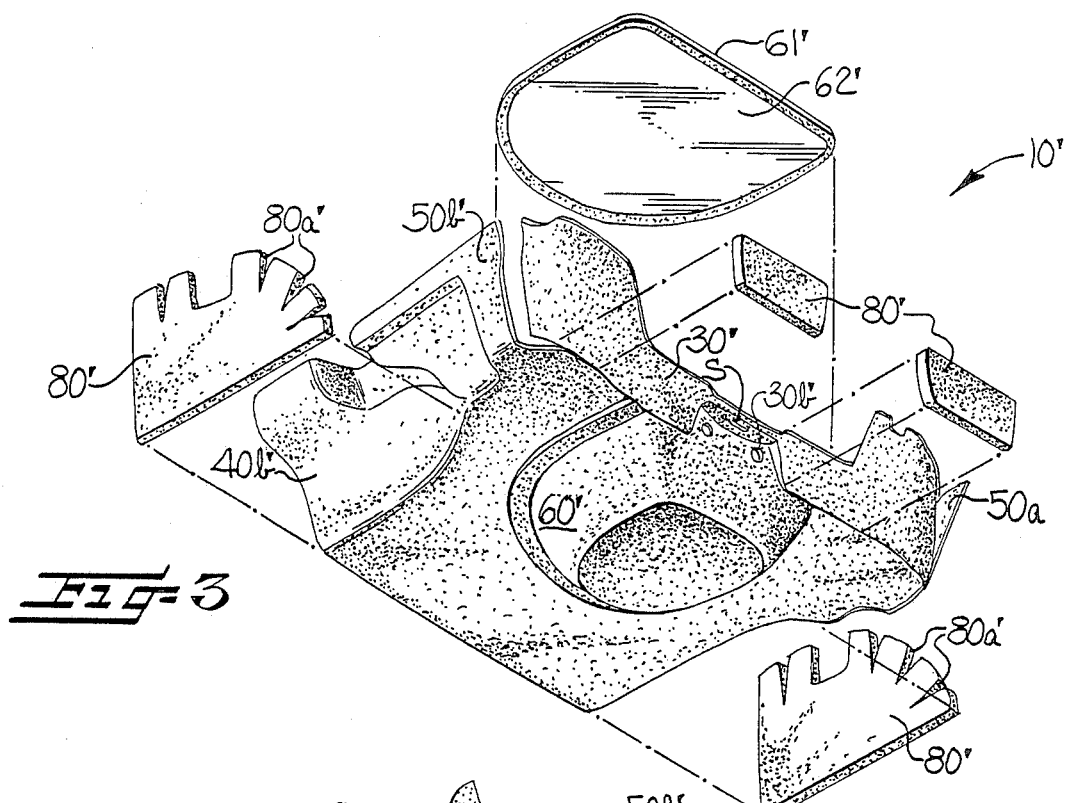
FIG. 3 is an exploded perspective view of the completed trunk liner after the same has been suitably trimmed following molding and after the insulator pads have been applied at predetermined areas along the back of the various panels and wherein the spare tire cover having a rigid lid connected thereto has been placed in overlying relationship to the recessed spare tire well.
Figure 4:
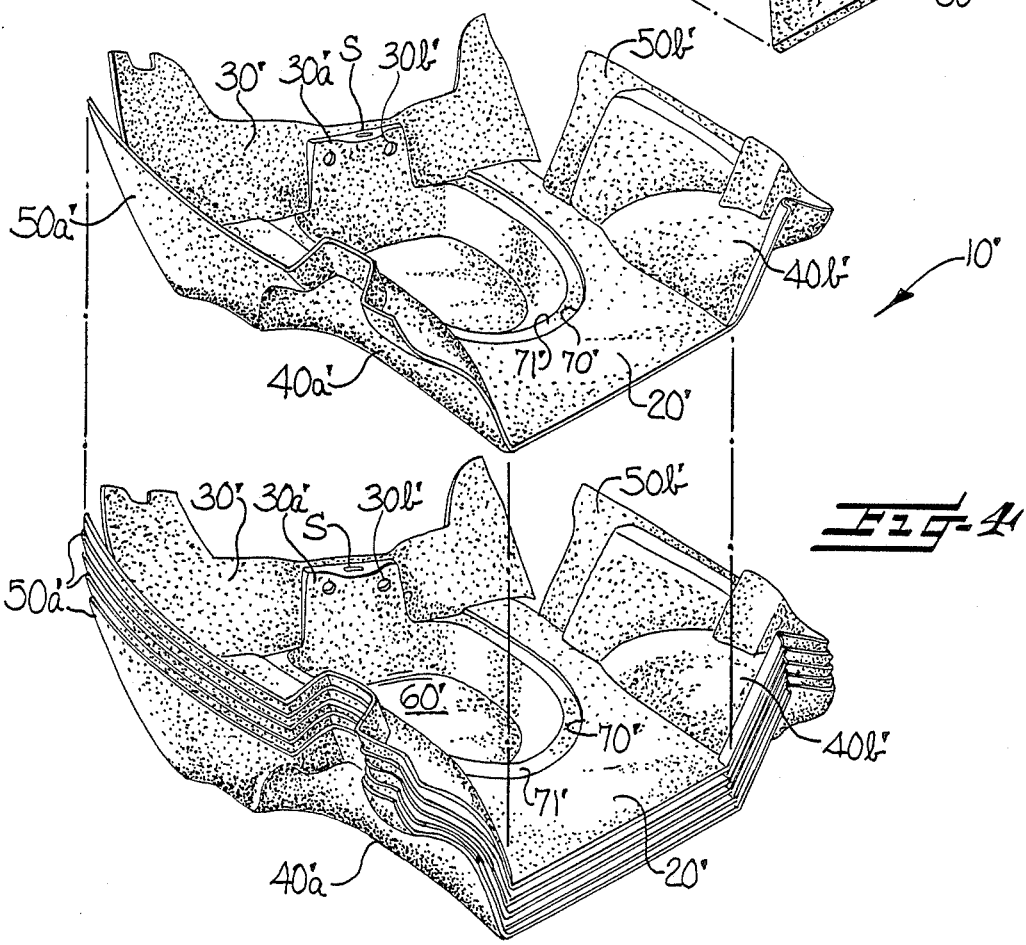
FIG. 4 is a perspective view of a stack of finished trunk liners shown nestingly arranged for facilitating shipment and handling thereof.
Figure 5:
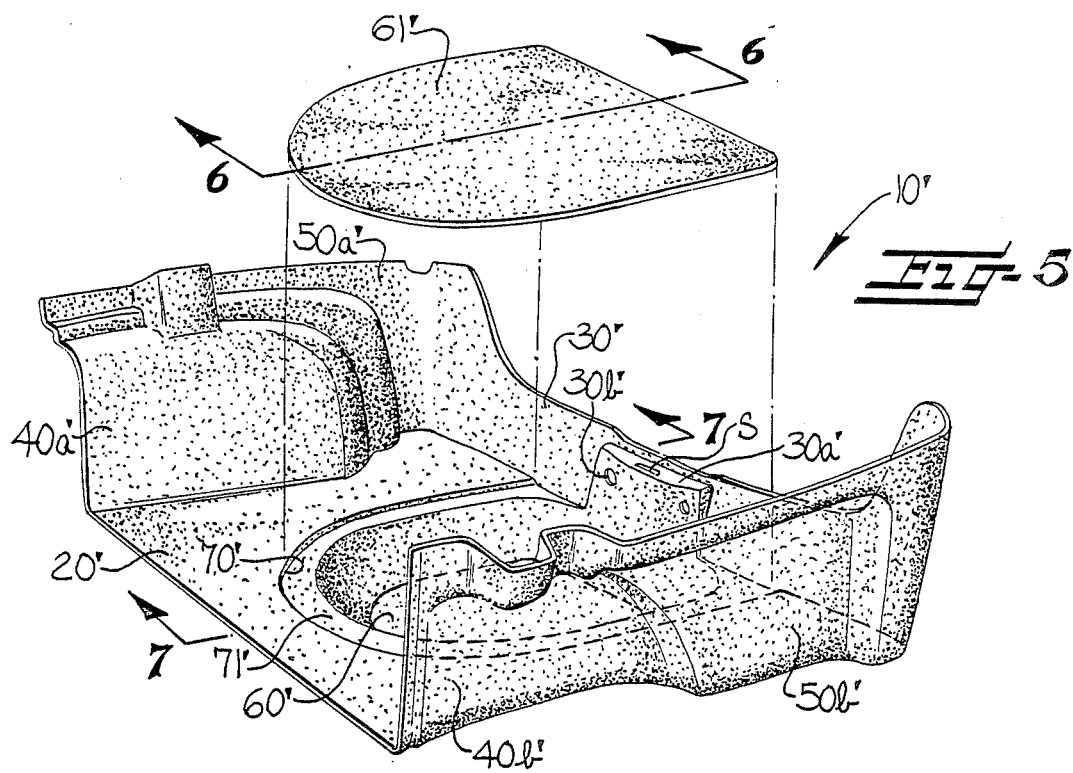
FIG. 5 is another top perspective view of the trunk liner wherein the spare tire cover is positioned for overlying engagement with the recessed spare tire well.

Referring now particularly to FIG. 3, reference numeral 10' designates the finished or completed trunk liner after the same has been suitably trimmed following the molding thereof and after insulator pads have been added to predetermined areas of the backside thereof, as well as after a cover 61' has been provided for covering the spare tire well liner 60, of the automobile trunk liner 10'. Comparing FIG. 3 (wherein the prime notation has been added to molded liner elements) with FIGS. 1 and 2, it will be noted that gusset portions G in FIGS. 1 and 2, have been removed as by cutting along the dotted lines as indicated. The removal of these gusset portions G permits the rear end panel 30' to be moved substantially to the perpendicular position as when installed, as best seen in FIG. 5. Similarly, as also shown in FIG. 5, the removal of the gussets G permit the right and left rear wheel housing cover panels 40a', 40b' and right and left inner panels 50a' and 50b', to also be moved to the substantially vertical position. Also, since right and left inner panels 50a' and 50b' are integrally connected to the right and left rear wheel housing cover panels 40a', 40b', these inner panels 50a', 50b' may also be moved to the substantially vertical position upon the removal or trimming of the gussets G from the molded liner 10. Once the gussets G are trimmed, the relatively thin shell-like construction and the outwardly diverging relation of the plurality of panels extending along the sides of the center floor cover panel 20' impart nestability to the trunk liner 10, to permit a plurality of the trunk liners 10' to be compactly nested with each other to form a nested stack of trunk liners 10' to thereby facilitate handling and shipping of trunk liners 10' (FIG. 4).

As earlier noted, all the plurality of panels extending along the sides of the center floor cover panel 20' are arranged to extend upwardly and outwardly therefrom so as to be in outwardly diverging relation thereto. The overall molded body also is stiff and has an imparted shape retention. As can best be seen in FIG. 10, which shows a sectional view of the trunk liner 10' installed within the trunk compartment C of an automobile, the stiffness of the molded fibrous body and the outwardly diverging relationship of the plurality of panels causes the panels to resiliently engage the inner wall surfaces of the trunk compartment C to facilitate maintaining the trunk liner 10' in engagement with the walls of the trunk compartment C.

Figure 6:
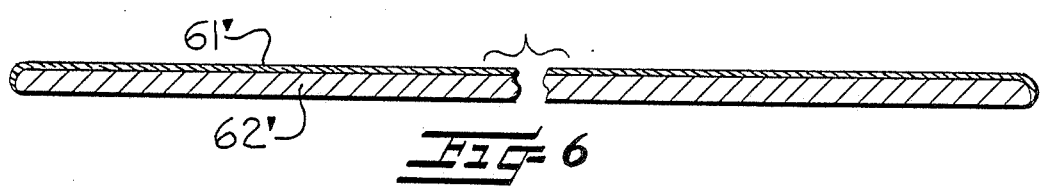
FIG. 6 is an enlarged transverse sectional view of the spare tire cover taken substantially along Line 6—6 of FIG. 5.

Referring now to the spare tire cover 61', as best shown in the perspective view of FIG. 5 and the sectional view of FIG. 6, the spare tire cover 61' is provided with a rigid lid 62' on the backside of the cover 61' thereof and which is suitably secured to the cover 61' as by a suitable adhesive such as a heat activatable hot melt adhesive. The rigid lid 62' can be formed of any suitable rigid material such as panel board, compressed board or the like, which will provide structural integrity. To maintain an aesthetically pleasing appearance, the spare tire cover 61' has its edge portions overlying and covering the periphery of the rigid lid 62' (FIG. 6).

Figure 7:
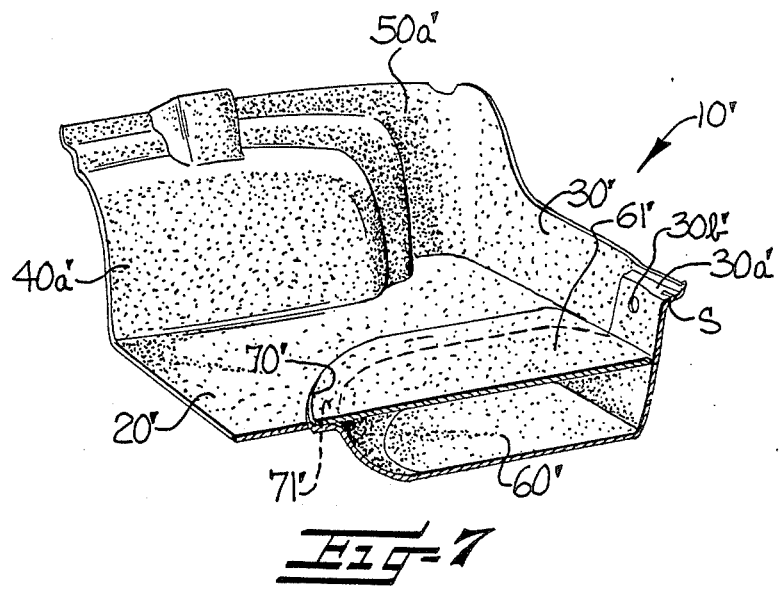
FIG. 7 is a cutaway top perspective view taken along Line 7—7 of FIG. 5 showing the trunk liner having the spare tire cover overlying the recessed spare tire well.
Figure 8:
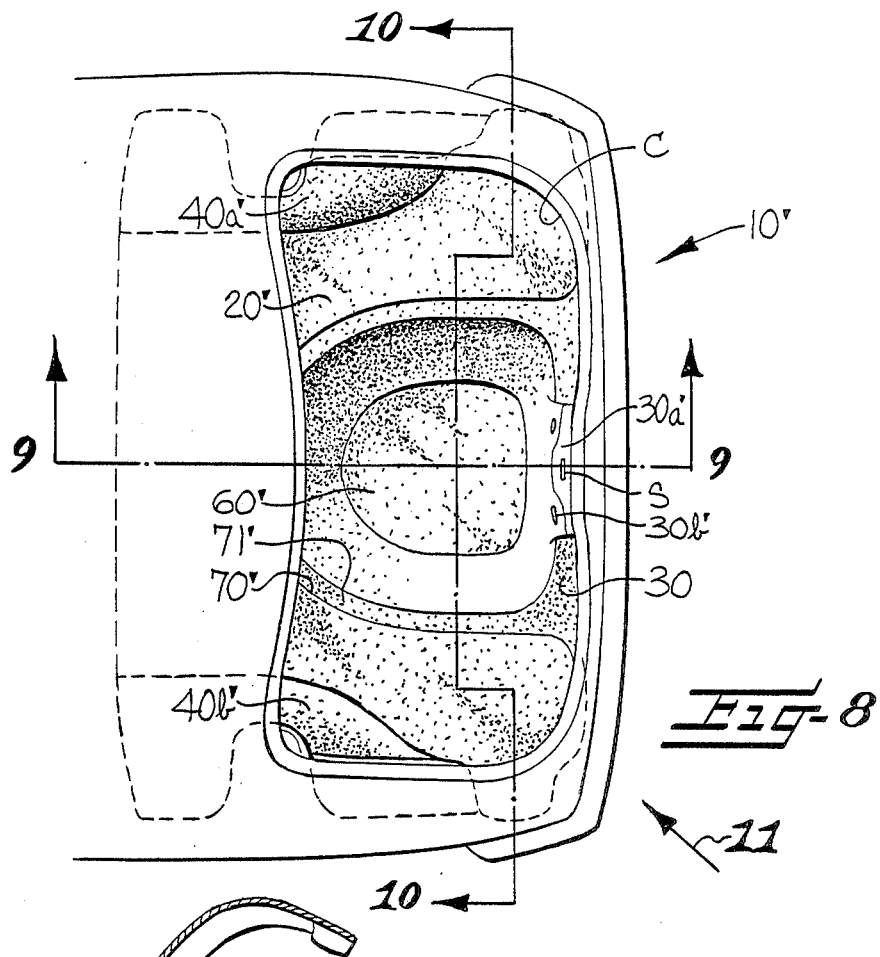
FIG. 8 is a top plan view showing the trunk liner installed within the trunk compartment of an automobile.
Figure 9:
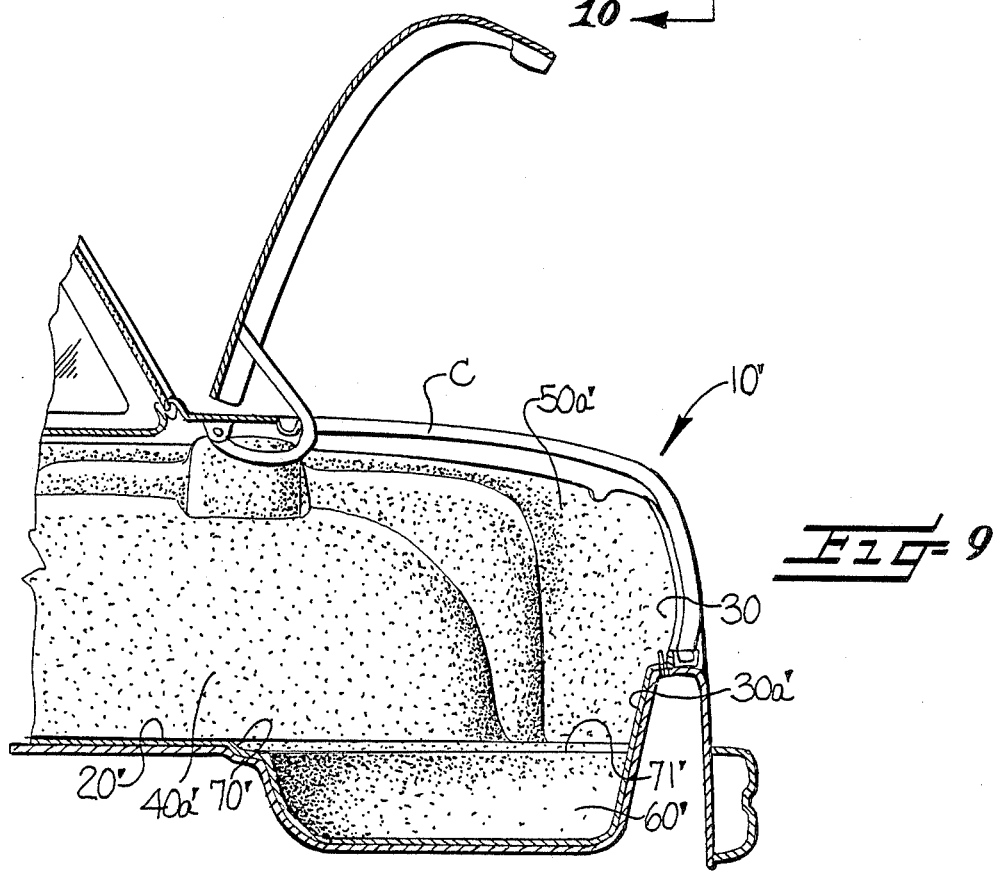
FIG. 9. is a sectional view of the trunk compartment taken along Line 9—9 of FIG. 8.
Figure 10:
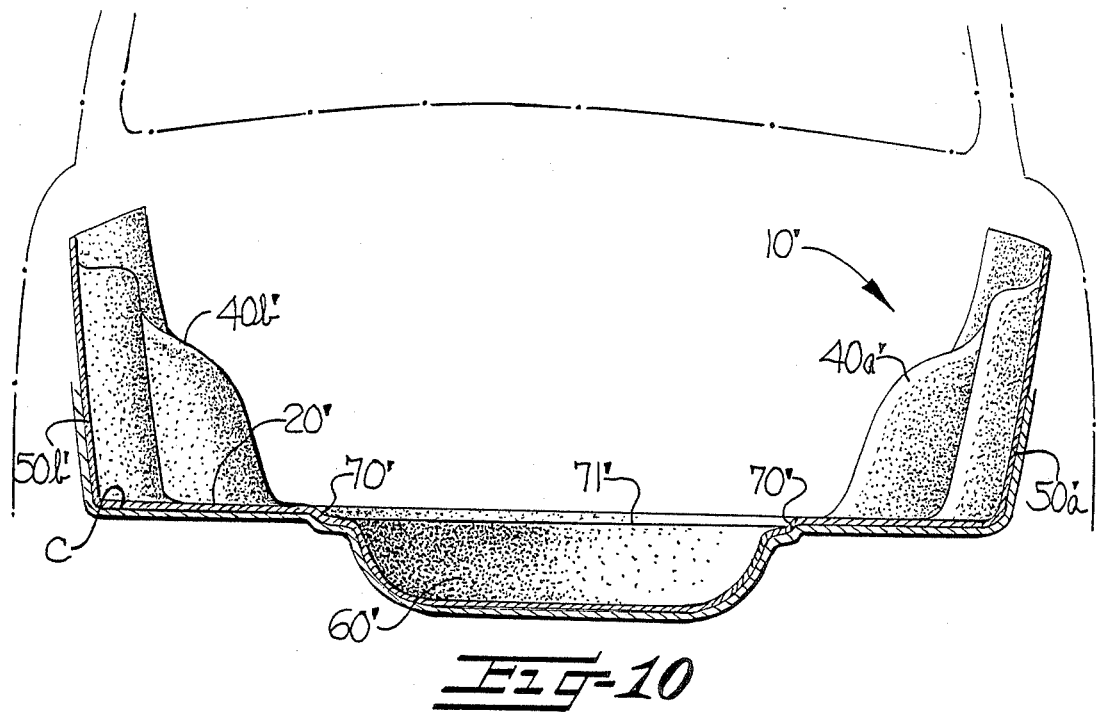
FIG. 10 is a sectional view of the trunk compartment taken along Line 10—10 of FIG. 8.
Figure 11:
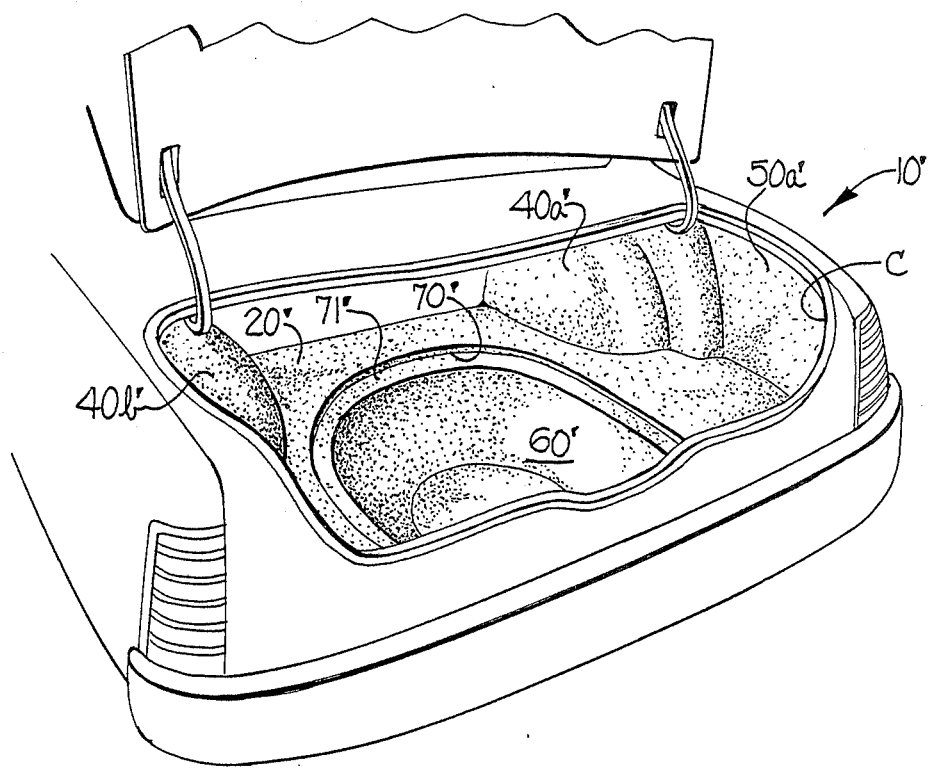
FIG. 11, is a top perspective view showing the trunk liner installed within the trunk compartment of an automobile wherein the recessed spare tire well is uncovered.

In use, the spare tire cover 61' overlies and rests upon adjacent edge portions of the center floor cover panel 20' so as to cover the recessed spare tire well liner 60'. As best seen in FIG. 7, the spare tire cover 61' is dimensioned to overlie and rest on the relatively narrow ledge portion 71' extending between the upstanding shoulder 70' and the recessed spare tire well liner 60'. When in place, the spare tire cover 61' and the center floor cover panel 20' are essentially coplanar giving an aesthetically pleasing look thereto.

Referring again more particularly to the exploded view of FIG. 3, it will be seen wherein a plurality of fibrous insulator pads 80' of various thicknesses are secured to the backside of predetermined areas of the plurality of panels extending upwardly and outwardly from the center floor cover panel 20'. Such pads 80' provide an additional amount of acoustical and thermal insulation which would not ordinarily be provided by the trunk liner 10'. Depending on the acoustical and thermal insulation desired, the insulator pads 80' can vary in thickness as the insulation requirements mandate. It will be noted that three rectangular shaped insulator pads 80' are shown secured to the backside of the rear end panel 30' and that relatively large quadrant shaped insulator pads 80' are secured to the backside of the right and left rear wheel housing cover panels 40a', 40b'. It will be noted that these latter insulator pads have notches 80a' cut inwardly from the periphery thereof so that the pads may readily be accommodated to the arcuate inner surfaces of the wheel housing cover panels 40a', 40b'. These insulator pads 80' may be secured to the molded trunk liner 10' by any suitable adhesive, which may also be of the hot melt type of adhesive.

Referring to FIGS. 3 to 5 and 8 to 9, it will be noted that the rear end panel 30' has a forwardly bulging portion 30a' in the upper central portion thereof, and that a slot S is provided therethrough. This bulging portion 30a' accommodates therebehind the latching mechanism for the automobile trunk lid with the slot S serving to permit protrusion therethrough of a loop portion of a lock. To aid in prelocating and securing the truck liner 10' within the trunk compartment C, the holes 30b' are punched in the rear end panel 30' on the bulging portion 30a'. Appropriate fasteners are provided therethrough.

Once the trunk liner is installed, an undersized spare tire as is commonly used in the industry may be positioned within the recessed spare tire well liner 60'. The spare tire well liner 60' is covered with the spare tire cover 61' and rigid lid 62'. In those instances when a full size spare tire is stored, the spare tire cover 61' is not used since a full size tire positioned within the recessed spare tire well liner 60, extends upwardly beyond the well.

That which is claimed is:

1. A trunk liner for an automobile trunk compartment to lie adjacent the walls of the trunk, said trunk liner comprising an integrally molded relatively stiff fibrous body having a center floor cover panel, and a plurality of panels extending upwardly along the sides of said center floor cover panel and integrally connected thereto, and a recessed spare tire well liner integral with and extending downwardly from a medial portion of said center floor cover panel.

2. A trunk liner for an automobile trunk compartment, said trunk liner comprising a relatively thin shell-like integrally molded and relatively stiff fibrous body formed of textile fibers, said body having a relatively soft fibrous upper surface and including a center floor cover panel, and a plurality of panels extending upwardly along the sides of said center floor cover panel and integrally connected thereto, and a recessed spare tire well liner integral with and extending downwardly from a medial portion of said center floor cover panel.

3. A trunk liner for an automobile trunk compartment, said trunk liner comprising an integrally molded relatively stiff fibrous body having a center floor cover panel, and a plurality of panels extending upwardly along the sides of said center floor cover panel, a recessed spare tire well liner integral with and extending downwardly from a medial portion of said center floor cover panel, an upstanding shoulder integrally formed in said center floor cover panel and extending around a substantial portion of said spare tire well liner and in spaced relation thereto, and a relatively narrow ledge portion extending between said upstanding shoulder and said spare tire well liner.

4. A trunk liner for an automobile trunk compartment, said trunk liner comprising a relatively thin shell-like integrally molded and relatively stiff fibrous body formed of textile fibers, said body having a relatively soft fibrous upper surface and including a center floor cover panel, and a plurality of panels extending upwardly along the sides of said center floor cover panel and integrally connected thereto, a recessed spare tire well liner integral with and extending downwardly from a medial portion of said center floor cover panel, an upstanding shoulder integrally formed in said center floor cover panel and extending around a substantial portion of said spare tire well liner and in spaced relation thereto, and a relatively narrow ledge portion extending between said upstanding shoulder and said spare tire well liner.

5. A trunk liner for an automobile trunk compartment, said trunk liner comprising an integrally molded relatively stiff fibrous body having a center floor cover panel, and a plurality of panels extending upwardly along the sides of said center floor cover panel and integrally connected thereto, a recessed spare tire well liner integral with and extending downwardly from a medial portion of said center floor cover panel, said plurality of panels extending upwardly and outwardly from said center floor cover panel so as to be in outwardly diverging relation to said center floor cover panel, said stiffness of said molded fibrous body and the outwardly diverging relationship of said plurality of panels causing said panels to resiliently engage inner wall surfaces of the trunk when the panels are biased inwardly toward an upright position when mounted in the trunk to thereby facilitate mounting the trunk liner in the trunk of the automobile and maintaining the trunk liner in the installed position in engagement with the walls of the trunk.

6. A trunk liner for an automobile trunk compartment, said trunk liner comprising a shell-like integrally molded and relatively stiff fibrous body formed of textile fibers, said body having a relatively soft fibrous upper surface and including a center floor cover panel, and a plurality of panels extending upwardly along the sides of said center floor cover panel and integrally connected thereto, a recessed spare tire well liner integral with and extending downwardly from a medial portion of said center floor cover panel, said plurality of panels extending upwardly and outwardly from said center floor cover panel so as to be in outwardly diverging relation to said center floor cover panel, said stiffness of said molded fibrous body and the outwardly diverging relationship of said plurality of panels causing said panels to resiliently engage inner wall surfaces of the trunk when the panels are biased inwardly toward an upright position when mounted in the trunk to thereby facilitate mounting the trunk liner in the trunk of the automobile and maintaining the trunk liner in the installed position in engagement with the wall of the trunk.

7. A trunk liner for an automobile trunk compartment, said trunk liner comprising an integrally molded relatively stiff fibrous body having a center floor cover panel, and a plurality of panels extending upwardly along the sides of said center floor cover panel and integrally connected thereto, a recessed spare tire well liner integral with and extending downwardly from a medial portion of said center floor cover panel, said plurality of panels comprising a rear end panel having lower end portions connecting rearmost portions of said center floor cover panel and divergingly extending upwardly and outwardly therefrom, right and left rear wheel housing cover panels respectively connected to opposite sides of said floor cover panel and divergingly extending upwardly and outwardly therefrom, and right and left inner panels respectively connected to opposite sides of said center floor cover panel and divergingly extending upwardly and outwardly therefrom, said right and left inner panels being rearwardly of said right and left rear wheel housing cover panels and respectively connected to rearmost portions of said right and left rear wheel housing cover panels, said stiffness of said molded fibrous body and the outwardly diverging relationship of said plurality of panels causing said panels to resiliently engage inner wall surfaces of the trunk when the panels are biased inwardly toward an upright position when mounted in the trunk to thereby facilitate mounting the trunk liner in the trunk of the automobile and maintaining the trunk liner in the installed position in engagement with the walls of the trunk.

8. A trunk liner according to claims 1, 2, 3, 4, 5, 6 or 7 including a thermoplastic coating on the back side of said fibrous body imparting hardness to the back side and overall stiffness and shape retention to the fibrous body.

9. A trunk liner according to claims 1, 2, 3, 4, 5, 6 or 7 wherein a spare tire cover overlies said recessed spare tire well liner and has edge portions overlying adjacent portions of said center floor cover panel.

10. A trunk liner according to claims 1, 2, 3, 4, 5, 6 or 7 wherein a spare tire cover is provided in medial portions of said center floor cover panel in overlying relation to said recessed spare tire well liner, a rigid lid carried by said spare tire cover on the back side thereof and adapted to overlie and rest upon adjacent edge portions of said center floor cover panel and cover said spare tire well liner, and said spare tire cover having edge portions overlying and covering the periphery of said rigid lid to present an aesthetically pleasing appearance thereto.

11. A trunk liner according to claims 1, 2, 3, 4, 5, 6 or 7 including insulator pads connected to the back side of predetermined areas of said plurality of panels for acoustical and thermal insulation.

12. A trunk liner according to claims 1, 2, 3, 4, 5, 6 or 7 including insulator pads of various thicknesses secured to the back side of predetermined areas of said plurality of panels for acoustical and thermal insulation.

13. A trunk liner according to claims 5, 6 or 7 wherein said trunk liner is of a relatively thin shell-like construction and wherein said shell-like construction and said outwardly diverging relation of said plurality of panels extending along the sides of said center floor cover panel impart nestability to the trunk liner to permit a plurality of the trunk liners to be compactly nested with each other to form a nested stack of trunk liners to thereby facilitate the handling and shipping of trunk liners.

14. The combination with an automobile trunk compartment of a trunk liner, said trunk liner comprising an integrally molded relatively stiff fibrous body having a center floor cover panel, and a plurality of panels extending upwardly along the sides of said center floor cover panel and integrally connected thereto, a recessed spare tire well liner integral with and extending downwardly from a medial portion of said center floor cover panel, said plurality of panels being molded to extend upwardly and outwardly from said center floor cover panel so as to be in outwardly diverging relation to said center floor cover panel when uninstalled, said stiffness of said molded fibrous body and the outwardly diverging relationship of said plurality of panels causing said panels to resiliently engage the inner wall surfaces of the trunk to facilitate maintaining the trunk liner in engagement with the walls of the trunk.

15. The combination with an automobile trunk compartment of a trunk liner, said trunk liner comprising a relatively thin shell-like integrally molded and relatively stiff fibrous body formed of textile fibers, said body having a relatively soft fibrous upper surface and including a center floor cover panel, and a plurality of panels extending upwardly along the sides of said center floor cover panel and integrally connected thereto, a recessed spare tire well liner integral with and extending downwardly from a medial portion of said center floor cover panel, said plurality of panels extending upwardly and outwardly from said center floor cover panel so as to be in outwardly diverging relation to said center floor cover panel when uninstalled, said stiffness of said molded fibrous body and the outwardly diverging relationship of said plurality of panels causing said panels to resiliently engage inner wall surfaces of the trunk to facilitate maintaining the trunk liner in engagement with the walls of the trunk.

16. The combination with an automobile trunk compartment of a trunk liner, said trunk liner comprising an integrally molded relatively stiff fibrous body having a center floor cover panel, and a plurality of panels extending upwardly along the sides of said center floor cover panel and integrally connected thereto, a recessed spare tire well liner integral with and extending downwardly from a medial portion of said center floor cover panel, said plurality of panels comprising a rear end panel having lower end portions connecting rearmost portions of said center floor cover panel and divergingly extending upwardly and outwardly therefrom, right and left rear wheel housing cover panels respectively connected to opposite sides of said floor cover panel and divergingly extending upwardly and outwardly therefrom, and right and left inner panels respectively connected to opposite sides of said center floor cover panel and divergingly extending upwardly and outwardly therefrom, said right and left inner panels being rearwardly of said right and left rear wheel housing cover panels and respectively connected to rearmost portions of said right and left rear wheel housing cover panels, said stiffness of said molded fibrous body and the outwardly diverging relationship of said plurality of panels causing said panels to resiliently engage inner wall surfaces of the trunk to facilitate maintaining the trunk liner in engagement with the walls of the trunk.

17. The combination with an automobile trunk compartment of a trunk liner according to claims 14, 15 or 16 including a thermoplastic coating on the back side of said fibrous body of said trunk liner imparting hardness to the back side and overall stiffness to the fibrous body.

18. The combination with an automobile trunk compartment of a trunk liner according to claims 14, 15 or 16 wherein a spare tire cover overlies said recessed spare tire well liner and has edge portions overlying adjacent portions of said center floor cover panel.

19. The combination with an automobile trunk compartment of a trunk liner according to claims 14, 15 or 16 wherein a spare tire cover is provided in medial portions of said center floor cover panel in overlying relation to said recessed spare tire well liner, a rigid lid carried by said spare tire cover on the backside thereof and adapted to overlie and rest upon adjacent edge portions of said center floor cover panel and cover said spare tire well liner, and said spare tire cover having edge portions overlying and covering the periphery of said rigid lid to present an aesthetically pleasing appearance thereto.

20. The combination with an automobile trunk compartment of a trunk liner according to claims 14, 15 or 16 including insulator pads connected to the back side of predetermined areas of said plurality of trunk liner panels for acoustical and thermal insulation.

21. The combination with an automobile trunk compartment of a one-piece trunk liner according to claims 14, 15, or 16 including insulator pads of various thickness secured to the back side of predetermined areas of said plurality of trunk liner panels for acoustical and thermal insulation.

22. The combination with an automobile trunk compartment of a trunk liner, said trunk liner comprising an integrally molded relatively stiff fibrous body having a center floor cover panel, and a plurality of panels extending upwardly along the sides of said center floor cover panel and integrally connected thereto, a recessed spare tire well liner integral with and extending downwardly from a medial portion of said center floor cover panel, and a relatively narrow recessed ledge extending around a substantial portion of said spare tire well liner and adapted to supportingly receive a rigid lid, said plurality of panels being molded to extend upwardly and outwardly from said center floor cover panel so as to be in outwardly diverging relation to said center floor cover panel when uninstalled, said stiffness of said molded fibrous body and the outwardly diverging relationship of said plurality of panels causing said panels to resiliently engage the inner wall surfaces of the trunk to facilitate maintaining the trunk liner in engagement with the walls of the trunk.

23. The combination with an automobile trunk compartment of a trunk liner, said trunk liner comprising a relatively thin shell-like integrally molded and relatively stiff fibrous body formed of textile fibers, said body having a relatively soft fibrous upper surface and including a center floor cover panel, and a plurality of panels extending upwardly along the sides of said center floor cover panel and integrally connected thereto, a recessed spare tire well liner integral with and extending downwardly from a medial portion of said center floor cover panel, and a relatively narrow recessed ledge, extending around a substantial portion of said spare tire well liner and adapted to supportingly receive a rigid lid, said plurality of panels extending upwardly and outwardly from said center floor cover panel so as to be in outwardly diverging relation to said center floor cover panel when uninstalled, said stiffness of said molded fibrous body and the outwardly diverging relationship of said plurality of panels causing said panels to resiliently engage inner wall surfaces of the trunk to facilitate maintaining the trunk liner in engagement with the walls of the trunk.

* * * * *